United States Patent [19]

Weder et al.

[11] Patent Number: 5,381,642
[45] Date of Patent: Jan. 17, 1995

[54] METHOD OF WRAPPING A FLORAL GROUPING USING A MATERIAL HAVING POSTIONING MARKS

[75] Inventors: Donald E. Weder; John W. Bergstrand, both of Highland, Ill.

[73] Assignee: Highland Supply Corporation, Highland, Ill.

[21] Appl. No.: 10,899

[22] Filed: Jan. 29, 1993

Related U.S. Application Data

[63] Continuation-in-part of Ser. No. 968,798, Oct. 30, 1992, and a continuation-in-part of Ser. No. 965,585, Oct. 23, 1992, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, said Ser. No. 968,798, is a continuation of Ser. No. 865,563, May 21, 1992, Pat. No. 5,245,814, which is a continuation-in-part of Ser. No. 649,379, Jan. 31, 1991, Pat. No. 5,111,638, which is a continuation of Ser. No. 249,761, Sep. 26, 1988, abandoned.

[51] Int. Cl.⁶ .................... B65B 11/04; B65B 11/48; B65B 25/02
[52] U.S. Cl. .................... 53/399; 53/411; 53/465; 47/72; 229/87.01
[58] Field of Search ............ 53/397, 399, 465, 462, 53/466, 51, 411; 229/87.01; 47/72; 428/317.1

[56] References Cited

U.S. PATENT DOCUMENTS

| | | | |
|---|---|---|---|
| 1,525,015 | 2/1925 | Weeks | 53/465 X |
| 2,170,147 | 8/1939 | Lane | 53/399 X |
| 2,340,373 | 2/1944 | Gardner | 47/72 X |
| 3,027,263 | 3/1962 | Wanamaker | 53/465 |
| 3,271,922 | 9/1966 | Wallerstein et al. | 53/399 |
| 3,508,372 | 4/1970 | Wallerstein et al. | |
| 4,989,396 | 2/1991 | Weder et al. | 53/465 X |
| 5,007,229 | 4/1991 | Weder et al. | 53/462 X |
| 5,111,637 | 5/1992 | Weder et al. | 53/397 |
| 5,111,638 | 5/1992 | Weder | 53/397 |
| 5,181,364 | 1/1993 | Weder | 53/465 X |
| 5,239,804 | 8/1993 | Weder et al. | 53/465 X |
| 5,245,814 | 9/1993 | Weder | 53/462 X |
| 5,307,605 | 5/1994 | Straeter | 53/397 |

*Primary Examiner*—Horace M. Culver
*Attorney, Agent, or Firm*—Dunlap, Codding & Lee

[57] ABSTRACT

A wrapping material for wrapping a floral arrangement, comprising a sheet of material having an angle cut, the sheet of material having tick marks to indicate where to dispose a floral arrangement thereupon. The sheet of material has a bonding material disposed thereupon. A floral arrangement is utilized, the floral arrangement being disposed on the sheet of material generally in the area designated by the tick mark, the floral arrangement being wrapped in the sheet of material and being substantially surrounded and encompassed therein. Methods of using the wrapping material to wrap a floral arrangement.

31 Claims, 3 Drawing Sheets

5,381,642

METHOD OF WRAPPING A FLORAL GROUPING USING A MATERIAL HAVING POSTIONING MARKS

CROSS-REFERENCE TO RELATED APPLICATIONS

This application is a continuation-in-part of co-pending U.S. Ser. No. 07/968,798, filed Oct. 30, 1992, entitled METHOD FOR WRAPPING AN OBJECT WITH A MATERIAL HAVING PRESSURE SENSITIVE ADHESIVE THEREON, which is a continuation of U.S. Ser. No. 07/865,563, filed May 21, 1992, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,245,814, which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638, which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now ABANDONED; and this application is also a continuation-in-part of co-pending U.S. Ser. No. 07/965,585, filed Oct. 23, 1992, entitled WRAPPING A FLORAL GROUPING WITH SHEETS HAVING ADHESIVE OR COHESIVE MATERIAL APPLIED THERETO, which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364, which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now ABANDONED, which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now ABANDONED.

FIELD OF THE INVENTION

This invention generally relates to wrapping materials, and, more particularly, to wrapping materials having a tick mark and an angle cut for wrapping individual flowers or a floral arrangement, and the method of using same.

DESCRIPTION OF THE PREFERRED EMBODIMENTS

Floral arrangements and individual flowers are usually wrapped in a wrapping material, to protect the delicate blooms and foliage from damage. And, the wrapping material utilized frequently is square or rectangular and has some bonding material thereon, such as an adhesive or cohesive, so that the wrapping material retains its wrapped shape, and securely encompasses the floral arrangement in order to protect it. This type of wrapping material, however, has its disadvantages.

A significant disadvantage occurs when a rectangular or square sheet of wrapping material is wrapped about a single flower or a small grouping of flowers. The flower(s) are disposed on the sheet of wrapping material at an oblique angle. The desired effect is to have sufficient wrapping to cover the bloom portion of the flower(s), while permitting the stem portion to extend from the wrapping. To wrap one or more flowers, a significant amount of the sheet of material must be tucked around the stem area, creating undue bulk, creating a lumpy wrapped appearance in the stem area of the wrapped flower(s), and generally detracting from the aesthetic appearance of the wrapped flower(s).

Further, to properly wrap a single flower or a small grouping of flowers, the flower(s) should be disposed in a particular position, so that the upper portion of the wrapping fully protects the delicate bloom portion of the flower(s), while the stem portion is exposed and extends from the wrap, enabling the flower(s) to be kept fresh by immersing or wetting the stem end(s) of the flower(s) in water (by using any method known in the art). Failure to dispose the flower(s) in a particular position may cause the bloom portion to extend away from the protection of the wrapping material, permitting possible damage to occur to the bloom(s). Further, the complete stem end(s) of the flower(s) may be wrapped, so that a florist or delivery personnel are unable to immerse a portion of the stem end(s) in water, thus causing the flower(s) to wilt much more rapidly. Therefore, failure to properly wrap single flower(s), or small groupings of flowers(s), results in likely damage to the flower(s), which interferes with a recipient's enjoyment of the beauty and visual quality of the gift of a single flower, a small grouping of flowers, or a floral arrangement.

The present invention contemplates a wrapping material which has a bonding material thereon (the bonding material being described in detail below), which is separable into sheets which have specific angles cut therein, and which having markings disposed in certain locations on each sheet of material (the markings comprise "tick marks," which will be described in further detail below), which permit an operator to dispose a flower or small grouping of flowers in a specific location on the sheet of material, and to wrap the sheet of material around the flower(s) in a manner which places only the necessary wrapping about the stem area, but leaves the stem end(s) exposed as desired so that the stem ends may be immersed in water or kept dampened, preventing wilting. The present invention also permits sufficient wrapping of the material about the bloom(s), protectively surrounding the bloom portion of the flower(s) to reduce damage. Therefore, the present invention contemplates a sheet of wrapping material for single flower(s) or groupings of flowers which acts to enhance, protect and preserve the aesthetic appearance of the flower(s).

Figures 1, 2, 3, 4:
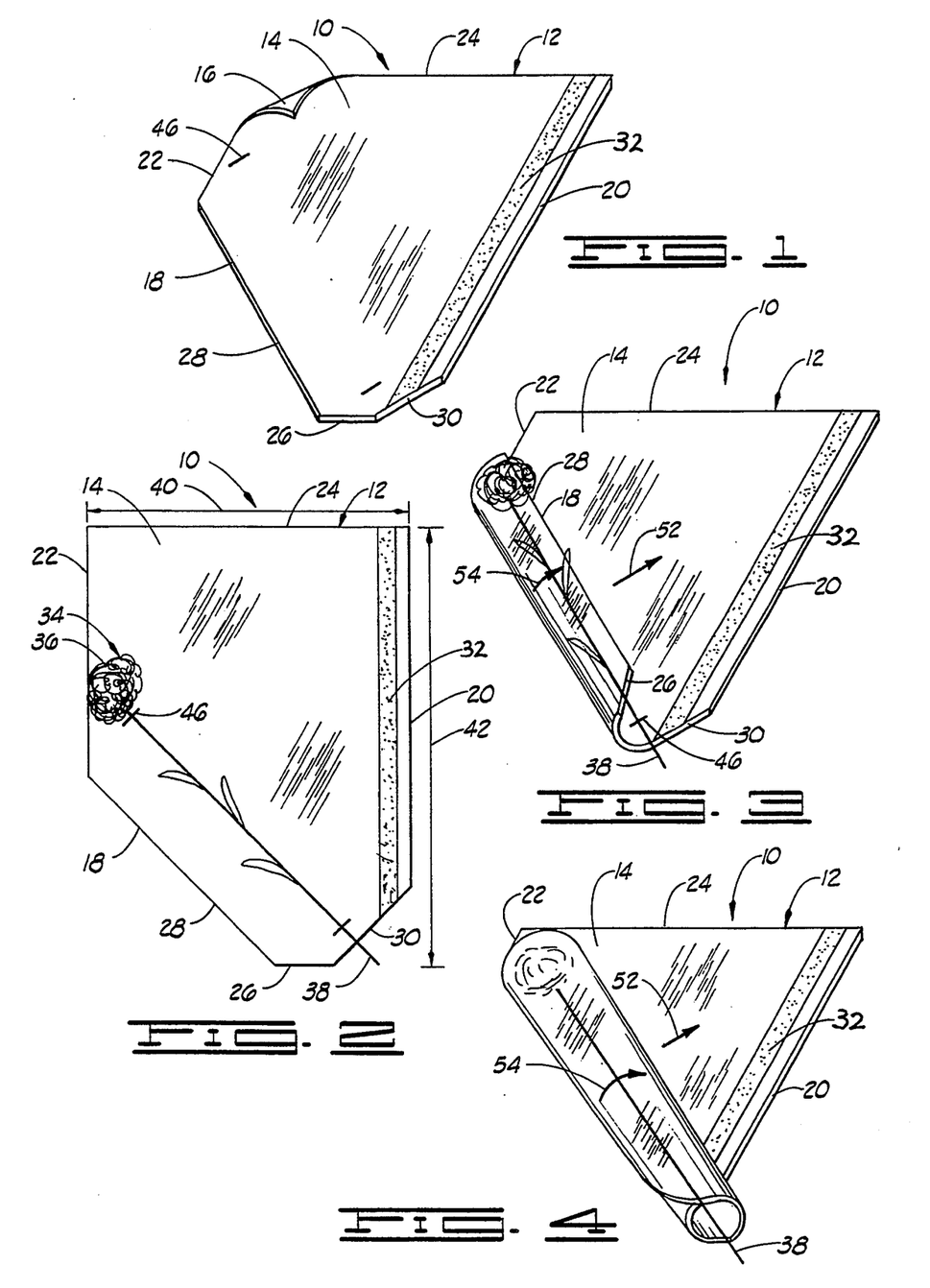
FIG. 1 is a perspective view of the wrapping material of the present invention showing the upper surface, the wrapping material having a bonding material extending near one side, the wrapping material also having an angle cut and tick marks.
FIG. 2 is a top plan view of the wrapping material of FIG. 1, but showing a floral arrangement disposed thereon, generally between tick marks.
FIG. 3 is a perspective view of the wrapping material of FIGS. 1-2, but showing a partially wrapped floral arrangement.
FIG. 4 is a perspective view of the wrapping material of FIGS. 1-2, but showing a partially wrapped floral arrangement.

THE EMBODIMENT OF FIGS. 1–2

Referring to FIGS. 1 and 2, designated generally by the reference numeral 10 is a wrapping material which is constructed in accordance with the present invention. The wrapping material 10 comprises at least one sheet of material 12. The sheet of material 12 has an upper surface 14, a lower surface 16 (one edge of the sheet of material lifted for illustration purposes only), and an outer periphery 18. The outer periphery 18 of the sheet of material 12 further comprises a first side 20, a second side 22, a third side 24, a fourth side 26, a fifth side 28, and a sixth side 30. The sheet of material 12 also has a bonding material 32, which is described in detail below.

The sheet of material 12 is utilized to wrap a floral arrangement 34. "Floral arrangement" as used herein means cut fresh flowers, artificial flowers, other fresh and/or artificial plants or other floral materials and may include other secondary plants and/or ornamentation which add to the aesthetics of the overall floral arrangement 34. The floral arrangement 34 comprises a flower end 36 which may comprise either a bloom or a foliage portion, and the floral arrangement 34 also comprises a stem end 38. However, it will be appreciated that the floral arrangement 34 may consist of only a single bloom or only foliage (not shown). In one embodiment, the floral arrangement 34 comprises a small grouping of flowers, for example, six long stemmed roses (not shown). In an alternative embodiment, the floral arrangement 34 comprises a single flower, such as a long-stemmed rose, as shown in FIG. 2.

In the embodiment of FIGS. 1–2, the sheet of material 12 is abstractly shaped. It will be appreciated, however, that any shape or size of sheet of material 12 may be used to wrap a floral arrangement 34 as long as it is sufficiently sized and shaped to wrap and encompass the floral arrangement 34, and accomplishes the purposes described herein. For example, the sheet of material 12 may also comprise other geometric or non-geometric shapes. When multiple sheets of material 12 are used together, they may be connected together or laminated, or may comprise separate layers. Finally, it will be appreciated that the sheet of material 12 shown in all embodiments herein is substantially flat.

The sheet of material 12 may be constructed of a single sheet of material 12 or a plurality of sheets of material 12. Any thickness of the sheet of material 12 may be utilized in accordance with the present invention as long as the sheet of material 12 may be wrapped about a floral arrangement 34, as described herein. Typically the sheet of material 12 has a thickness in a range of less than about 0.2 mils to about 10 mils. In a preferred embodiment, the sheet of material 12 is constructed from one sheet of man-made organic polymer film having a thickness in a range of from less than about 0.5 mils to about 2.5 mils.

The sheet of material 12 is constructed from any suitable material that is capable of being wrapped about a floral arrangement 34. Preferably, the wrapping material 10 comprises paper (untreated or treated in any manner), cellophane, foil, polymer film, fiber (woven or non-woven or synthetic or natural), cloth (woven or non-woven or natural or synthetic), burlap, or any combination thereof.

The term "polymer" is used herein means any polymer film. For example, but not by way of limitation, one polymer film is a polypropylene film. Another example of a polymer film, but not by way of limitation, is cellophane. Polymer films are well known in the art, and commercially available.

The sheet of material 12 may vary in color. Further, the sheet of material 12, may consist of designs which are printed, etched, and/or embossed; in addition, the sheet of material 12 may have various colorings, coatings, flockings, and/or metallic finishes, or be characterized totally or partially by pearlescent, translucent, transparent, iridescent, or the like characteristics. Each of the above-named characteristics may be occur alone or in combination. Moreover, each surface of the sheet of material 12 may vary in the combination of such characteristics.

The sheet of material 12 has a width 40 (FIG. 2) extending generally between the first side 20 and the second side 22, respectively, sufficiently sized whereby the sheet of material 12 can be wrapped about and substantially surrounded and compass a floral arrangement 32. The sheet of material 12 has a length 42 (FIG. 2) extending generally between the third side 24 and the fourth side 26, respectively, sufficiently sized whereby the sheet of material 12 extends over a substantial portion of the floral arrangement 34 when the sheet of material 12 has been wrapped about the floral arrangement 34 in accordance with the present invention shown and described in detail herein.

The sheet of material 12 may further comprise an ink, dye, and/or pigment (not shown). Such inks, dyes, and pigments are known in the art, and are commercially available, and may be disposed upon or incorporated in the sheet of material 12 by any method described herein or known in the art. For example, the ink, dye, or pigment may form a portion of a design or decoration on the sheet of material. Such a design or decoration may comprise any geometric, non-geometric, or fanciful form, such as flowers, leaves, and the like.

The sheet of material 12 also comprises a bonding material 32. The term "bonding material" as used herein means an adhesive, preferably a pressure sensitive adhesive, a thermal sensitive adhesive, or a cohesive. Where the bonding material 32 is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to affect the seal. The term "bonding material" is used herein also means a heat sealing lacquer which may be applied to the sheet of material and, in this instance, heat must also be applied to effect sealing. The term "bonding material" is used herein means any type of material or thing which can be used to affect the bonding or connecting the two adjacent portions of the material or the sheet of material 12 as described herein.

The bonding material 32 may comprise varying bonding characteristics when disposed on certain portions of the sheet of material 12. "Varying bonding characteristics" means less adhesion or cohesion of the bonding material 32, that is, less "tack" of the bonding material 32. Therefore, when the bonding material 32 is disposed on a sheet of material, the bonding material 32 may have varying bonding characteristics, that is, less bonding characteristics at or near one portion of the sheet of material 12, for example, near the junction of the first side 20 and the third side 24, than is present along the remainder of the bonding material 32. It will be appreciated that less bonding of the bonding material 32 may be located at any point in the bonding material 32, however.

Further, the bonding material 32 may also comprise at east one color derived from dye, ink, and/or pigment, as previously described herein. Bonding materials 32 as described herein are known in the art and commercially available.

A bonding material 32 is disposed upon the sheet of material 12, preferably on a surface, that is the upper surface 14, the lower surface 16, or a combination thereof. The bonding material 32 is also preferably disposed near at least one side. The bonding material 32 may be disposed on the sheet of material 12 by any method known in the art, including, but not by way of limitation, painting it thereupon, spraying it thereupon, brushing it thereupon, and/or lacquering it thereupon. The bonding material 32, as previously described, is preferably a pressure sensitive adhesive. Such use of adhesives, and particularly pressure sensitive adhesives is taught in U.S. Pat. No. 5,111,638, entitled, "Method For Wrapping An Object With A Material Having Pressure Sensitive Adhesive Thereon," which is hereby incorporated by reference herein.

In the embodiments shown in FIGS. 1–2, the bonding material 32 is shown disposed near the first side 20 of the sheet of material. It will be appreciated, however, that the bonding material 32 may be disposed on any surface or combination of surfaces of the sheet of material 12, as long as the placement of the bonding material 32 is consistent with the purposes described herein.

The sheet of material 12 shown in FIGS. 1–2 is angle cut "Angle cut," as used herein, means a diagonal and/or oblique angle which is cut into a sheet of material. The angle cuts shown in FIGS. 1–2 comprise the fifth side 28 and the sixth side 30 of the sheet of material 12. It will be understood, however, that any number of angle cuts cut be utilized in a sheet of material 12, as long as the purpose as described herein is obtained. Further any geometric cut, non-geometric cut, or combination thereof may also be utilized, as long as it is consistent with the purpose of the present invention.

The sheet of material 12 preferably has one or more markings referred to as "tick marks" 46. (Only one marking, that is, "tick mark" designated as tick mark 46). "Tick mark" means any mark (such as a straight line, curved line, or the like), letter or combination of letters, symbols (such as a flower, bloom, stem, leaves, arrow, geometric shapes, or non-geometric shape), or combination thereof, which is utilized to indicate precisely where to dispose the floral arrangement 34 on the sheet of material 12. Such tick marks 46 permits the floral arrangement 34 to be disposed in an optimal position on the sheet of material 12, and also permits the sheet of material 12 to be wrapped about the floral arrangement 34 in a manner which renders an attractive wrapping, thus enhancing the aesthetic appeal of the floral arrangement 34. The tick marks 46 indicate to an operator where to place the flower end 36 of a floral arrangement 34. The tick marks 46 also indicate to an operator where to place the stem end 38 of the floral arrangement 34. When a floral arrangement 34 is placed on the sheet of material 12 as indicated by the tick marks 46, the flower end 36 will be wrapped so that the flower end 36 is completely, but loosely, surrounded by the sheet of material 12, while the stem end 38 of the floral arrangement 34 will extend a distance away from the wrapping, permitting the stem end to be wetted or immersed in water.

Figure 5:
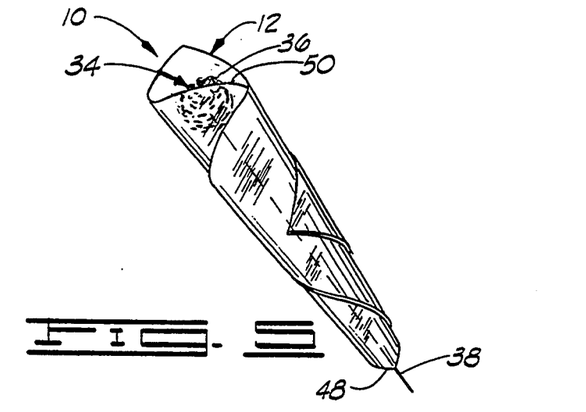
FIG. 5 is a perspective view of the wrapping material of FIGS. 1-2, but showing a wrapped floral arrangement.

THE METHOD OF USE OF FIGS. 3–5

The floral arrangement 34 is disposed upon the sheet of material 12, and wrapped in the sheet of material, in a method of use. Such a method of use is disclosed and taught in U.S. Pat. No. 5,181,364, issued Jan. 26, 1993, entitled, "Wrapping A Floral Grouping With Sheets Having Adhesive or Cohesive Material Applied Thereto," which is hereby incorporated by reference herein.

In a general method of use of the embodiments illustrated in FIGS. 3–5, the wrapping material 10 comprising a single sheet of sheet of material 12 and a floral arrangement 34, as previously described, are provided. The sheet of material 12 is sized to wrap about and substantially surround and encompass a floral arrangement 34. The floral arrangement 34 is disposed on the sheet of material 12 using the tick marks 46 as a guide to the precise placement of the floral arrangement. The tick marks 46 permit the floral arrangement 34 to be placed in an optimal position for wrapping, wherein when wrapped, the floral arrangement 34 will have an optimal aesthetic appearance. The sheet of material 12 is then wrapped about the floral arrangement 34.

A portion of the sheet of material 12, such as the fifth side 28 of the sheet of material 12, overlaps at least one other portion of the sheet of material 12 (FIG. 3). The overlapping portions of the sheet of material 12 are bonded to the sheet of material 12 by their contact with the bonding material 32 on the upper surface 14 of the sheet of material 12 which bondingly connects to the overlapping portions of the sheet of material 12, whereby the fifth side 28 and the second side 22 of the sheet of material 12 are bonded to overlapping portions of the sheet of material 12 generally between the third side 24 and the fourth side 26 of the sheet of material 12 whereby there are no loose flaps formed by unbonded portions of the sheet of material 12 (FIGS. 4–5). The sheet of material 12 substantially encompasses and surrounds a substantial portion of the flower end 36 of the floral arrangement 34 and a substantial portion of the stem end 38 of the floral arrangement 34. The sheet of material 12 is held about the floral arrangement 34 by the bonding of the overlapping portions of the sheet of material 12, the sheet of material 12 being preferably tightly wrapped about the stem end 38 of the floral arrangement 34, a portion of the stem end 38 extruding from the wrapped sheet of material 12 (FIG. 5).

The sheet of material 12 wrapped about the floral arrangement 34 forms a wrapping which may be a conically shaped wrapping (FIG. 5) or which may be a cylindrically shaped wrapping (not shown), or which may comprise other geometric forms (square, rectangular, and the like) or non-geometric or asymmetrical formed wrappings (not shown). The wrapping has an opening extending through a lower end 48 thereof and an opening extending through the upper end 50 thereof with the stem end 38 of the floral arrangement 34 extending through the opening in the lower end 48 and the flower end 36 of the floral arrangement 34 being exposed near the opening in the upper end 50 thereof, the upper end 50 of the wrapping being preferably loosely wrapped about the flower end 36 of the floral arrangement 34.

FIGS. 3–5 show one specific method of use. A sheet of material 12 is provided, and disposed on a relatively horizontal surface (not shown). A floral arrangement 34, as described above, is also provided. A floral arrangement 34 is disposed on the upper surface 14 of the sheet of material 12, using the tick marks 46 located on the sheet of material 12 as a guide to the optimal placement of the floral arrangement 34 on the sheet of material 12. An operator then lifts a portion of the sheet of material 12 (generally the portion near the fifth side 28) and places the lifted portion over a portion of the floral arrangement 34, as shown in FIG. 3. In this position, the sheet of material 12 is rolled over the floral arrangement 34, and the sheet of material 12 and the floral arrangement 34 are then gently rolled in a general direction 53 (FIGS. 3–4) whereby the sheet of material 12 and the floral arrangement 34 contained therein are rolled across the surface, the floral arrangement 34 being rolled into the sheet of material 12, thereby rolling the sheet of material 12 generally about the floral arrangement 34 and containing and substantially encompassing and surrounding the floral arrangement 34 within the sheet of material 12.

The sheet of material 12 and the floral arrangement 34 are continued rolled in a rolling direction 54 and in the direction 52 generally toward the first side 20 of the sheet of material 12 until the floral arrangement 34 is disposed generally adjacent the first side 20 of the sheet of material 12, as shown in FIG. 4. In this position, the operator continues to roll the sheet of material 12 and the floral arrangement 34 disposed thereon in the rolling direction 54 and in the general direction 52 thereby rolling the sheet of material 12 across the surface and in doing so causing the firm bonding of the bonding material 32 thereon to bond to adjacent portions of the sheet of material 12. The adjacent lower surface 16 of the sheet of material 12 near the fifth side 28 and the second side 22 of the sheet of material 12 are then bondingly connected to the bonding material 32 on the upper surface 14 of the sheet of material 12, thereby securing the sheet of material 12 to itself, and securely wrapping the floral arrangement 34, as shown in FIG. 5.

It will be appreciated that the sheet of material 12 used to wrap a floral arrangement 34 may be provided, as described above, as a top sheet of material in a pad of sheets of material 12, or as a single sheet of material 12 severed from a roll of wrapping material 10, or as a sheet of material 12 removed from a roll of sheets of material 12 in a dispenser. Pads of sheets of material 12, rolls of sheets of material 12, and rolls supplied in a dispenser are described below.

Figure 6:
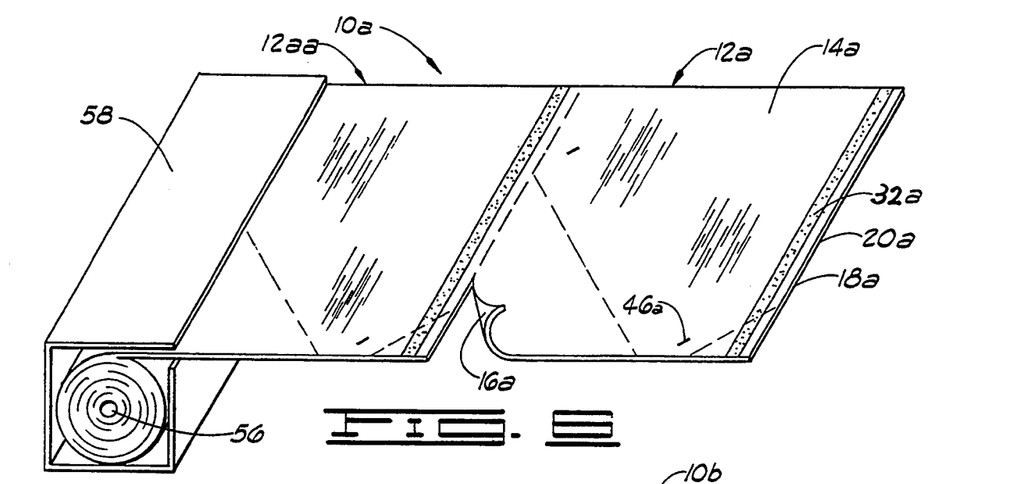
FIG. 6 is a perspective view of the wrapping material of FIG. 1, but showing a continuous roll of material comprising a plurality of sheets of material contained within a roll in a dispenser, each sheet having perforation therein.
Figure 7:
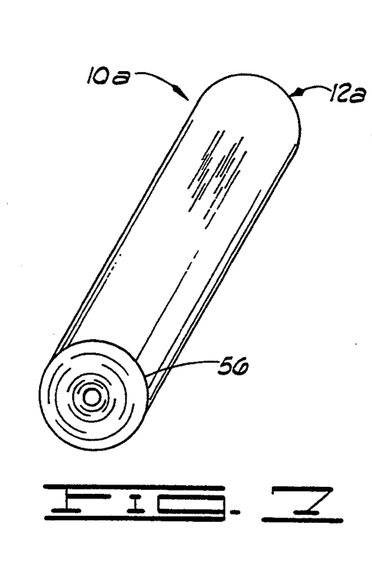
FIG. 7 is a perspective view of the wrapping material of FIG. 1, but showing a continuous roll of material comprising a plurality of sheets of material contained within a roll.

THE EMBODIMENT OF FIGS. 6–7

Illustrated in FIGS. 6–7 is a modified material 10a which is constructed exactly like the material 10 shown in FIGS. 1–2 and described in detail previously except that the material 10a comprises a roll 56 of sheets of material 12a contained within a dispenser 58, as shown in FIG. 6. The roll 56 contains a material 10a comprising a plurality of sheets of material 12a in the roll 56, the sheets of material 12a being connected by perforations to form the roll 56 (the sheet of material 12a shown partially detached and turned upward for illustration purposes only). Such a roll 56 may be provided without a dispenser 58 as well, as shown in FIG. 7. Such rolls 56 permit one sheet of material 12a to be withdrawn from the roll 56, and the sheet of material 12a is detached or severed from the roll 56.

Alternatively, the roll 56 may simply be formed as a continuous roll 56 without perforations, and the wrapping material 10a may be withdrawn from the roll 56 and a portion may be severed into separate sheets of material 12a by serrated cutting edge (not shown) contained within the dispenser 58, or by a separate cutting element (not shown). Any number of sheets of material 12a may form the roll 56 as long as it is possible to withdraw at least one sheet of material 12a from the roll 56. It will be understood therefore that the roll 56 may comprise only one sheet of material 12a, without the dispenser 58 (not shown).

It will also be appreciated that the sheet of material 12a may contain perforations which not only separate the roll 56 into separate sheets of material 12a, but which are also provided within each sheet of material 12a, to permit portions within the sheet of material 12a to be removed, so that an angle cut sheet of material 12a may be created. Such perforated sheets of material 12a are shown in FIG. 6. Alternatively, however, after each sheet of material 12a is removed from the roll 56, the sheet of material 12a may be die cut by a cutting edge (not shown) so that the sheet of material 12a has one or more angle cuts. The sheet of material 12a may be cut by any means known in the art.

THE EMBODIMENT AND METHOD USE OF FIGS. 8–11

Illustrated in FIGS. 8–11 is a modified material 10 which is constructed exactly like the material 10 shown in FIGS. 1–2, and described in detail previously, except that the sheet of material 12b comprises a plurality of sheets of material 12b connected together to form a pad 60 of sheets of material 12b. The pad 60 comprises a plurality of sheets of material 12b stacked one on top of the other and positioned so that the periphery 18b, that is, the first sides 20b, the second sides 22b, the third sides 24b, the fourth sides 26b, the fifth sides 28b, and the sixth sides 30b of the sheets of material 12b in the pad 60 generally are aligned.

Figure 8:
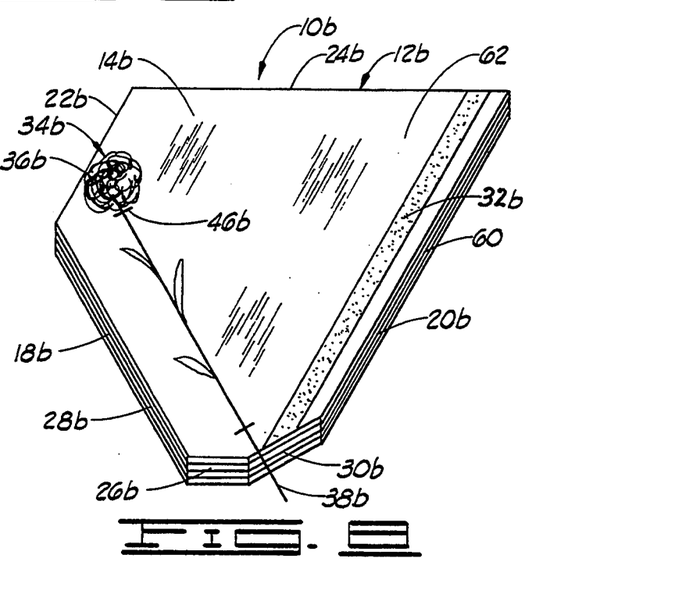
FIG. 8 is a perspective view of the wrapping material of FIGS. 1-2, but showing a plurality of sheets comprising a pad, a floral arrangement disposed upon the top sheet of material.

Referring to FIG. 8, the pad 60 further comprises a top sheet of material 62 and a next sheet of material 64 disposed thereunder, the other sheets of material 12b being disposed under the next sheet of material 64 in the pad 60 of the sheets of material 12b. Each sheet of material 12b in the pad 60 may have a bonding material 32b disposed thereupon, near at least a portion of the periphery 18b of each sheet of material 12b, and each sheet of material 12b having a bonding material 32b thereon is bondingly connectable to a portion of another sheet of material 12b for cooperating to connect the sheets of material 12b into the pad 60.

The top sheet of material 62 is capable of being disconnected from the pad 60 of sheets of material 12b. When the top sheet of material 62 is disconnected, the next sheet of material 64 forms the new top sheet of material 62, and the sheet of material 12b lying under the new top sheet of material 62 forms a new next sheet of material 64.

A bonding material 32b is disposed on each sheet of material 12b in the pad 60 and bondingly and releasably connects each sheet of material 12b to one other sheet of material 12b in the pad 60 whereby one of the sheets of material 12b can be releasably disconnected from another sheet of material 12b by pulling the sheets of material 12b apart. Further, the bonding material 32b bondingly and releasably connects each sheet of material 12b to portions of itself.

FIGS. 8-11 illustrate one method of use of the present invention. The wrapping material 10b and the sheet of material 12b illustrated in this embodiment and used in this method are constructed exactly the same as the wrapping material 10b and the sheet of material 12b in FIGS. 8-11 described in detail previously.

In a general method of use, a floral arrangement 34b is placed on the top sheet of material 62, the sheet of material 12b being sized to wrap about and substantially surround and encompass the floral arrangement 32b (FIG. 8). The sheet of material 12b is wrapped about the floral arrangement 34b, the sheet of material 12b simultaneously disconnecting from the pad 60 of sheets of material 12b as the sheet of material 12b is wrapped about the floral arrangement 34b. A portion of the sheet of material 12b, such as the fifth side 28b of the sheet of material 12b, overlaps at least one other portion of the sheet of material 12b. The overlapping portions of the sheet of material 12b are bonded to the sheet of material 12b by their contact with the bonding material 32b on the upper surface 14b of the sheet of material 12b which bondingly contacts and engages the overlapped portions of the sheet of material 12b, whereby the fifth side 28b and the second side 22b of the sheet of material 12b is bonded to overlapping portions of the sheet of material 12b generally between the third side 24b and the fourth side 26b of the sheet of material 12b whereby there are no loose flaps formed by unbonded portions of the sheet of material 12b. The sheet of material 12b substantially encompasses and surrounds a substantial portion of the flower end 36b of the floral arrangement 34b. The sheet of material 12b is held about the floral arrangement 34b by the bonding contact of the overlapping portions of the sheet of material 12b, the sheet of material 12b being preferably tightly wrapped about the stem end 38b of the floral arrangement 34b. The sheet of material 12b wrapped about the floral arrangement 34b forms a conically shaped wrapping (FIG. 11), or, alternatively, a cylindrically shaped wrapping (not shown), or, in further alternatives, may form any geometric, non-geometric, or asymmetrical shaped wrapping (not shown). Both shapes of wrapping shown herein have an opening extending through a lower end 48b thereof and an opening extending through the upper end 50b thereof with the stem end 38b of the floral arrangement 34b extending through the opening in the lower end 48b and the flower end 36b of the floral arrangement 34b being exposed near the opening in the upper end 50b thereof, the upper end 50b of the wrapping being preferably loosely wrapped about the flower end 36b of the floral arrangement 34b.

Figures 9, 10, 11:
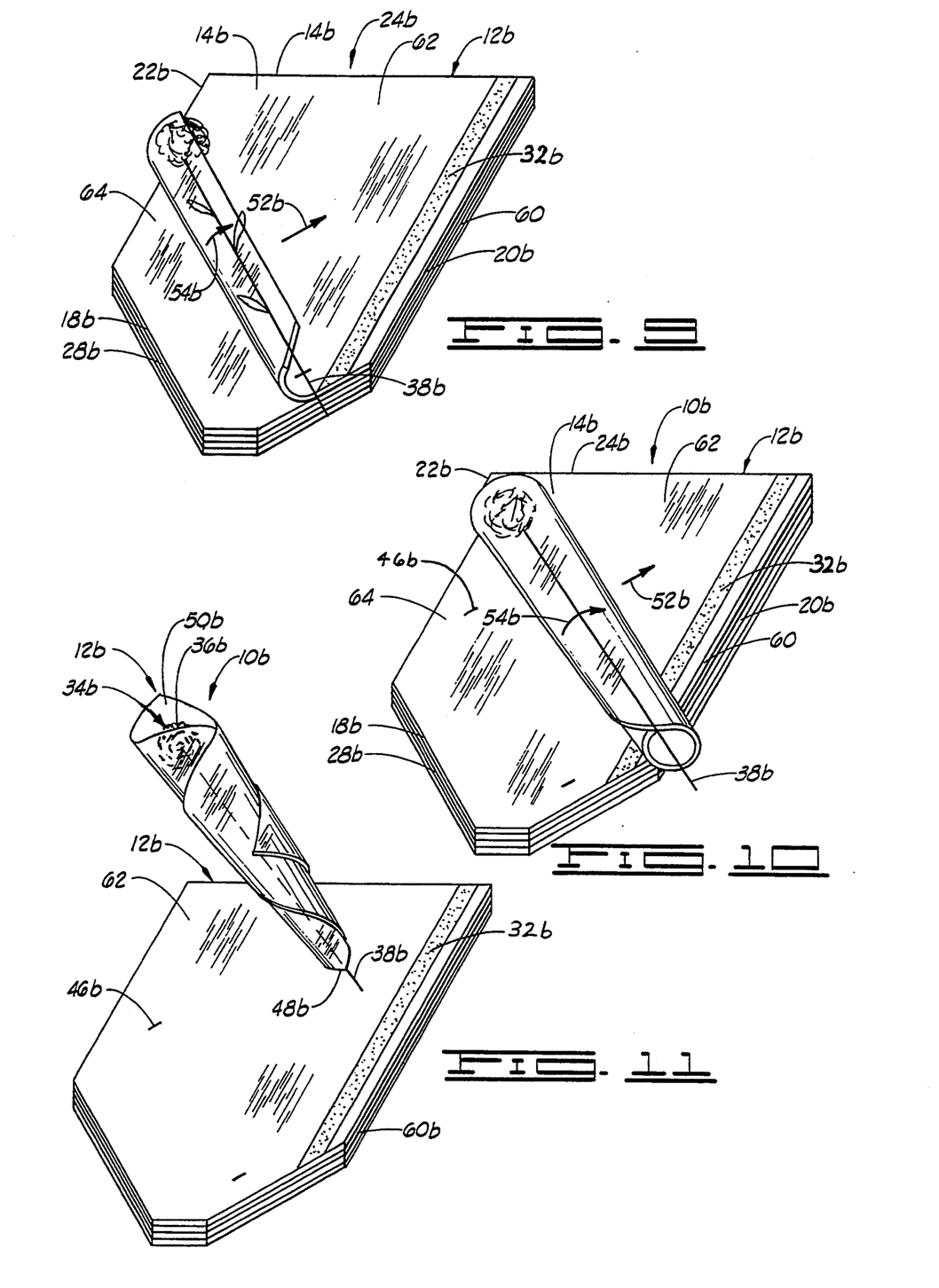
FIG. 9 is a perspective view of the wrapping material of FIG. 8, but showing a partially wrapped floral arrangement.
FIG. 10 is a perspective view of the wrapping material of FIG. 8, but showing a partially wrapped floral arrangement.
FIG. 11 is a perspective view of the wrapping material of FIG. 8, but showing a wrapped floral arrangement.

FIGS. 9-11 show a specific method of use. A plurality of sheets of material 12b in a pad 60, and a floral arrangement 34b, as described above, are provided. The floral arrangement 34b is disposed on the top sheet of material 62 on the pad 60 of sheets of material 12b. An operator then lifts a portion of the top sheet 62 (generally the portion near the fifth side 28b) and places the lifted portion over a portion of the floral arrangement 34b, as shown in FIG. 9. In this position, the top sheet of material 62 is rolled over the floral arrangement 34b, and the top sheet of material 62 and the floral arrangement 34b are rolled in a general direction 52b (FIGS. 9-10) whereby the top sheet of material 62 and the floral arrangement 34b contained therein are lifted from the next sheet of material 64 (FIG. 10), the floral arrangement 34b being rolled into the top sheet of material 62, thereby rolling the top sheet of material 62 generally about the floral arrangement 34b thereby surrounding and substantially encompassing the floral arrangement 34b within the top sheet of material 62.

The top sheet of material 46 and the floral arrangement 34b contained therein are continued rolled in a rolling direction 54b and in the direction 52b generally toward the first side 20b of the top sheet of material 62 until the floral arrangement 34b is disposed generally adjacent the first side 20b of the top sheet of material 46, as shown in FIGS. 10-11. In this position, the operator continues to roll the top sheet of material 62 and the floral arrangement 34b disposed thereon in the rolling direction 54b and in the general direction 52b thereby lifting the top sheet of material 62 from the next sheet of material 64 and the releasing the top sheet of material 62 from the bonding material 32b disposed on the next sheet of material 64, the next sheet of material 64 generally beneath the top sheet of material 62 and simultaneously disconnecting the top sheet of material 62 from the bonding material 32b connection between the top sheet of material 62 and the next sheet of material 64. The adjacent upper surface 14b near the fifth side 28b and the second side 22b of the top sheet of material 62 is then bondingly connected to the bonding material 32b on the upper surface 14b of the top sheet of material 62 near the first side 20b, thereby securely wrapping the floral arrangement 34b, as shown in FIG. 11.

When the top sheet of material 62 has been secured about the floral arrangement 34b in the manner just described, the next sheet of material 64, generally under the top sheet of material 62, then provides a new top sheet of material 62, the sheet of material 12b under the new top sheet of material 62 providing a new next sheet of material 64, and the process can be repeated for wrapping additional or other floral arrangements 34b.

Changes may be made in the embodiments of the invention described herein, or in parts or elements of the embodiments described herein, or in the sequence of steps of the methods described herein, without departing from the spirit and/or scope of the invention as defined in the following claims.

What is claimed is:

1. A method for wrapping a wrapping material about a floral arrangement, comprising the steps of:
providing a wrapping material for wrapping a floral arrangement, comprising:
a sheet of material having an upper surface, a lower surface and an outer periphery, the outer periphery of the sheet of material further comprising an angle cut, the sheet of material having a tick mark, wherein the placement of a floral arrangement on the sheet of material is designated by the tick mark, the sheet of material further having a bonding material disposed thereupon, the sheet of material sized to wrap about and substantially surround and encompass a floral arrangement;
providing a floral arrangement having an upper end consisting of a flower end and a lower end consisting of a stem end;
disposing the floral arrangement on the sheet of material, the floral arrangement being disposed on or adjacent the tick mark; and
wrapping the sheet of material about the floral arrangement by overlapping at least one portion of the sheet of material with at least one other portion of the sheet of material, one portion of the sheet of material thereby bondingly contacting and bondingly engaging to at least one other portion of the sheet of material, the sheet of material thereby substantially encompassing and surrounding a substantial portion of the floral arrangement, wherein disposing the floral arrangement on or adjacent the tick mark results in a substantial portion of the flower end of the floral arrangement being surrounded by the wrapped sheet of material, the stem end of the floral arrangement extending from the wrapped sheet of material.

2. The method of claim 1 wherein the step of providing a wrapping material further comprises providing the sheet of material wherein the outer periphery of the sheet of material further comprises a first side, a second side, a third side, a fourth side, a fifth side, and a sixth side.

3. The method of claim 1 wherein the step of providing a wrapping material further comprises providing the sheet of material having thickness in a range from less than 1 mil to about 30 mils.

4. The method of claim 1 wherein the step of providing a wrapping material further comprises providing the sheet of material having a thickness in a range of less than about 0.2 mils to about 10 mils.

5. The method of claim 1 wherein the step of providing a wrapping material further comprises providing the sheet of material having a thickness in a range of less than about 0.5 mils to about 2.5 mils.

6. The method of claim 1 wherein the step of providing a wrapping material further comprises providing the sheet of material selected from the group of materials consisting of paper (treated or untreated), cellophane, foil, polymer film, cellulose (including cellophane), fiber (woven or nonwoven or natural or synthetic), cloth (woven or nonwoven or natural or synthetic), burlap, or any combination thereof.

7. The method of claim 1 wherein the step of providing a wrapping material further comprises providing a plurality of sheets of material connected together to form a roll of sheets of material, and further comprising: withdrawing one sheet of material from the roll; and severing the one sheet of material from the roll.

8. The method of claim 1 wherein the step of providing a wrapping material further comprises providing a plurality of sheets of material connected together to form a roll of sheets of material, and further comprising:
unrolling a portion of the wrapping material from the roll; and
severing the unrolled portion of the material from the roll of material to form the sheet of material.

9. The method of claim 1 wherein the step of providing a wrapping material further comprises providing a sheet of material wherein the tick mark disposed thereon is selected from the group consisting of lines, letters, symbols, or a combination thereof.

10. The method of claim 1 wherein the step of wrapping the sheet of material about the floral arrangement further comprises forming a wrapping which is conically shaped.

11. The method of claim 1 wherein the step of wrapping the sheet of material about the floral arrangement further comprises forming a wrapping which is cylindrically shaped.

12. The method of claim 1 wherein the step of providing a wrapping material further comprises providing a plurality of sheets of material, each sheet of material having an upper surface, a lower surface, and an outer periphery, wherein the plurality of sheets of material together comprise a pad of sheets of material, the pad comprising a top sheet of material and a next sheet of material disposed thereunder, the other sheets of material being disposed under the next sheet of material in the pad of sheets of material, and wherein each sheet of material is releasably removable from the pad by pulling each sheet of material apart from an adjacent sheet of material.

13. The method of claim 1 wherein the step of providing a wrapping material further comprises providing the sheet of material wherein the bonding material disposed thereon comprises an adhesive.

14. The method of claim 1 wherein the step of providing a wrapping material further comprises providing the sheet of material wherein the bonding material disposed thereon comprises a cohesive.

15. The method of claim 1 wherein the step of providing a wrapping material further comprises providing a sheet of material wherein the bonding material disposed thereupon has varying bonding characteristics.

16. The method of claim 1 wherein the step of providing a floral arrangement further comprises providing the floral arrangement which comprises a single flower.

17. The method of claim 1 wherein the step of providing a floral arrangement further comprises providing the floral arrangement which comprises a plurality of flowers.

18. A method for wrapping a wrapping material about a floral arrangement, comprising the steps of:
providing a wrapping material for wrapping a floral arrangement, comprising:
a sheet of material having an upper surface, a lower surface and an outer periphery, the outer periphery of the sheet of material further comprising an angle cut, the sheet of material having a tick mark, wherein the placement of a floral arrangement on the sheet of material is designated by the tick mark, the sheet of material sized to wrap about and substantially surround and encompass a floral arrangement;

providing a floral arrangement having an upper end consisting of a flower end and a lower end consisting of a stem end;

disposing the floral arrangement on the sheet of material, the floral arrangement being disposed on or adjacent the tick mark; and wrapping the sheet of material about the floral arrangement by overlapping at least one portion of the sheet of material with at least one other portion of the sheet of material, the sheet of material thereby substantially encompassing and surrounding a substantial portion of the floral arrangement, wherein disposing the floral arrangement on or adjacent the tick mark results in a substantial portion of the flower end of the floral arrangement being surrounded by the wrapped sheet of material, the stem end of the floral arrangement extending from the wrapped sheet of material.

19. The method of claim 18 wherein the step of providing a wrapping material further comprises providing the sheet of material wherein the outer periphery of the sheet of material further comprises a first side, a second side, a third side, a fourth side, a fifth side, and a sixth side.

20. The method of claim 18 wherein the step of providing a wrapping material further comprises providing the sheet of material having thickness in a range from less than 1 mil to about 30 mils.

21. The method of claim 18 wherein the step of providing a wrapping material further comprises providing the sheet material having a thickness in a range of less than about 0.2 mils to about 10 mils.

22. The method of claim 18 wherein the step of providing a wrapping material further comprises providing the sheet of material having a thickness in a range of less than about 0.5 mils to about 2.5 mils.

23. The method of claim 18 wherein the step of providing a wrapping material further comprises providing the sheet of material selected from the group of materials consisting of paper (treated or untreated), cellophane, foil, polymer film, cellulose (including cellophane), fiber (woven or nonwoven or natural or synthetic), cloth (woven or nonwoven or natural or synthetic), burlap, or any combination thereof.

24. The method of claim 18 wherein the step of providing a wrapping material further comprises providing a plurality of sheets of material connected together to form a roll of sheets of material, and further comprising:

withdrawing one sheet of material from the roll; and severing the one sheet of material from the roll.

25. The method of claim 18 wherein the step of providing a wrapping material further comprises providing a plurality of sheets of material connected together to form a roll of sheets of material, and further comprising:

unrolling a portion of the wrapping material from the roll; and severing the unrolled portion of the material from the roll of material to form the sheet of material.

26. The method of claim 18 wherein the step of providing a wrapping material further comprises providing a sheet of material wherein the tick mark disposed thereon is selected from the group consisting of lines, letters, symbols, or a combination thereof.

27. The method of claim 18 wherein the step of wrapping the sheet of material about the floral arrangement further comprises forming a wrapping which is conically shaped.

28. The method of claim 18 wherein the step of wrapping the sheet of material about the floral arrangement further comprises forming a wrapping which is cylindrically shaped.

29. The method of claim 18 wherein the step of providing a wrapping material further comprises providing a plurality of sheets of material, each sheet of material having an upper surface, a lower surface, and an outer periphery, wherein the plurality of sheets of material together comprise a pad of sheets of material, the pad comprising a top sheet of material and a next sheet of material disposed thereunder, the other sheets of material being disposed under the next sheet of material in the pad of sheets of material, and wherein each sheet of material is releasably removable from the pad by pulling each sheet of material apart from an adjacent sheet of material.

30. The method of claim 18 wherein the step of providing a floral arrangement further comprises providing the floral arrangement which comprises a single flower.

31. The method of claim 19 wherein the step of providing a floral arrangement further comprises providing the floral arrangement which comprises a plurality of flowers.

* * * * *

UNITED STATES PATENT AND TRADEMARK OFFICE
CERTIFICATE OF CORRECTION

PATENT NO. : 5,381,642
DATED : January 17, 1995
INVENTOR(S) : Weder et al.

It is certified that error appears in the above-indentified patent and that said Letters Patent is hereby corrected as shown below:

On the title page, item [54], and column 1, line 2,
In the title, please delete "POSTIONING" and substitute therefor -- POSITIONING --.

On the title page, item [63],

Under "Related U.S. Application Data," the date "May 21, 1992" should be -- April 9, 1992 --.

Under "Related U.S. Application Data," please delete "continuation-in-part of Ser. No. 649,379" and substitute therefor -- continuation of Ser. No. 649,379 --.

Column 1, line 3, please delete "POSTIONING" and substitute therefor -- POSITIONING --.

Column 1, line 11, please delete "METHOD FOR WRAPPING AN OBJECT WITH A MATERIAL HAVING PRESSURE SENSITIVE ADHESIVE THEREON" and substitute therefor -- METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL --.

Column 1, line 14, please delete "May 21, 1992" and substitute therefor -- April 9, 1992 --.

UNITED STATES PATENT AND TRADEMARK OFFICE
CERTIFICATE OF CORRECTION

PATENT NO. : 5,381,642
DATED : January 17, 1995
INVENTOR(S) : Weder et al.

It is certified that error appears in the above-indentified patent and that said Letters Patent is hereby corrected as shown below:

Column 1, line 15, please delete "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL" and substitute therefor -- METHODS FOR WRAPPING A FLORAL GROUPING --.

Column 4, line 29, please delete "is" and substitute therefor -- as --.

Column 4, line 36, after "12" please delete ",".

Column 4, line 42, please delete the word "be".

Column 4, line 50, please delete "surrounded and compass" and substitute therefor -- surround and encompass --.

Column 4, line 51, please delete "32" and substitute therefor -- 34 --.

Column 5, line 12, please delete "affect" and substitute therefor -- effect --.

Column 5, line 12, please delete "is" and substitute therefor -- as --.

Column 5, line 16, please delete "is" and substitute therefor -- as --.

UNITED STATES PATENT AND TRADEMARK OFFICE
CERTIFICATE OF CORRECTION

PATENT NO. : 5,381,642
DATED : January 17, 1995
INVENTOR(S) : Weder et al.

It is certified that error appears in the above-indentified patent and that said Letters Patent is hereby corrected as shown below:

Column 5, line 17, please delete "affect" and substitute therefor -- effect --.

Column 5, line 36, please delete "east" and substitute therefor -- least --.

Column 5, line 41, after the word "is" please insert -- , --.

Column 5, line 64, after the word "cut" please insert -- . -- (first occurrence).

Column 6, line 1, please delete "cut" and substitute therefor -- can --.

Column 6, line 3, after the word "Further" please insert -- , --.

Column 6, line 15, please delete "permits" and substitute therefor -- permit --.

Column 7, line 43, please delete "53" and substitute therefor -- 52 --.

Column 8, line 57, please delete "10" and substitute therefor -- 10b --.

Column 9, line 38, please delete "32b" and substitute therefor -- 34b --.

UNITED STATES PATENT AND TRADEMARK OFFICE
CERTIFICATE OF CORRECTION

PATENT NO. : 5,381,642
DATED : January 17, 1995
INVENTOR(S) : Weder et al.

It is certified that error appears in the above-indentified patent and that said Letters Patent is hereby corrected as shown below:

Column 10, line 33, please delete "46" and substitute therefor -- 62 --.

Column 10, line 38, please delete "46" and substitute therefor -- 62 --.

Column 10, line 44, after the word "and" please delete the word "the".

Signed and Sealed this

Twenty-eighth Day of November 1995

Attest:

BRUCE LEHMAN

Attesting Officer

Commissioner of Patents and Trademarks